US012657767B2

(12) United States Patent
Pecchioli et al.

(10) Patent No.: US 12,657,767 B2
(45) Date of Patent: Jun. 16, 2026

(54) METHOD FOR DETERMINING THE ANGULAR POSITION OF A TRAILER RELATIVE TO A TOWING VEHICLE

(71) Applicant: Continental Autonomous Mobility Germany GmbH, Ingolstadt (DE)

(72) Inventors: Mathieu Pecchioli, Blagnac (FR); Jean-Baptiste Vimort, St Genis les Ollières (FR); Arnaud Moulas, Toulouse (FR)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 46 days.

(21) Appl. No.: 18/948,665

(22) Filed: Nov. 15, 2024

(65) Prior Publication Data

US 2025/0173894 A1 May 29, 2025

(30) Foreign Application Priority Data

Nov. 28, 2023 (FR) ........................................ 2313190

(51) Int. Cl.
    *G06T 7/73*         (2017.01)
    *B60R 1/25*         (2022.01)
    (Continued)

(52) U.S. Cl.
    CPC .................. *G06T 7/74* (2017.01); *B60R 1/25* (2022.01); *B60R 1/26* (2022.01); *G06T 7/62* (2017.01);
    (Continued)

(58) Field of Classification Search
    CPC ... B60R 1/25; B60R 1/26; G06T 2207/30244; G06T 2207/30252; G06T 7/62; G06T 7/73; G06T 7/74
    See application file for complete search history.

(56) References Cited

U.S. PATENT DOCUMENTS 9,446,713 B2    9/2016  Lu et al.
10,496,101 B2  12/2019  Ghneim et al.
(Continued)

FOREIGN PATENT DOCUMENTS

EP        2949531 A2 * 12/2015  ........... B60W 30/06
JP      2002181518 A * 6/2002  ............. G08G 1/167

OTHER PUBLICATIONS

French Search Report with English translation issued in corresponding Patent Application No. FR 2313190 dated Jun. 11, 2024, 40 pages.

*Primary Examiner* — Md N Haque

(74) *Attorney, Agent, or Firm* — Buchanan Ingersoll & Booney PC

(57) ABSTRACT

A method for determining a yaw angle of a longitudinal axis of a trailer relative to a longitudinal axis of a towing vehicle to which the trailer is hitched at a hitching point. The method includes: acquiring, by a camera mounted on a lateral side of the towing vehicle and oriented toward the trailer, an image of at least one lateral portion of the trailer; determining a reference on the image that is visible on the trailer; determining a visible length on the image between the reference and a vertical edge of the image oriented toward the towing vehicle; determining the yaw angle at least based on a horizontal field of view of the camera, a width of a matrix of pixels of the camera along a horizontal axis of the camera, coordinates of the hitching point, the visible length, and dimensions of at least one portion of the trailer.

10 Claims, 3 Drawing Sheets

(51) Int. Cl.
    *B60R 1/26*       (2022.01)
    *G06T 7/62*       (2017.01)

(52) U.S. Cl.
    CPC .............. *G06T 2207/30244* (2013.01); *G06T 2207/30252* (2013.01)

(56)           References Cited

U.S. PATENT DOCUMENTS

| | | |
|---|---|---|
| 10,793,069 B2 | 10/2020 | Ward et al. |
| 10,899,385 B2 | 1/2021 | Gali et al. |
| 11,410,431 B2 | 8/2022 | Pliefke et al. |
| 2014/0085469 A1* | 3/2014 | Sakano ..................... G06T 7/80 |
| | | 348/148 |
| 2018/0365859 A1* | 12/2018 | Oba ..................... B60W 40/114 |
| 2019/0098221 A1* | 3/2019 | Troy ........................ H04N 7/18 |
| 2020/0317127 A1 | 10/2020 | Archer |
| 2021/0042961 A1* | 2/2021 | Greenwood ........... H04N 23/54 |

* cited by examiner

100

| acqu-ima | 101 |
| det-rep | 102 |
| det-long-vis | 103 |
| det-$\beta_{norm}$ | 104 |
| det-intersec | 105 |
| det-angl-lac | 106 |

Fig. 5

METHOD FOR DETERMINING THE ANGULAR POSITION OF A TRAILER RELATIVE TO A TOWING VEHICLE

CROSS REFERENCE TO RELATED APPLICATIONS

This application claims priority to French Application No. 2313190, filed Nov. 28, 2023, the contents of such application being incorporated by reference herein.

FIELD OF THE INVENTION

The present disclosure relates to the field of detecting the angular position of a trailer.

More specifically, the present disclosure relates to a method for determining a yaw angle of a longitudinal axis of a trailer relative to a longitudinal axis of a towing vehicle.

BACKGROUND OF THE INVENTION

Solutions exist for assisting drivers in driving vehicles, by providing them, for example, with additional information concerning the configuration of the vehicle and its position relative to its environment. These technologies are also required in the context of fully autonomous vehicles. This is the case for private vehicles, but also for transport vehicles, typically comprising a towing vehicle and a trailer.

For assistance in driving such vehicles, and notably for reversing maneuvers aimed at parking the vehicle, it is important that the angular position of the trailer relative to the towing vehicle is precisely known, and notably the yaw angle that is subject to the greatest range.

Solutions already exist for determining the yaw angle of a trailer relative to a vehicle, some of which are based on the use of mechanical sensors, mounted on the hitching point, for example.

Such mechanical sensors are heavy, and their installation on a vehicle is difficult and requires a calibration phase.

Other known solutions are based on analyzing an image acquired by a camera located at the rear of the vehicle.

However, the field of view of a camera is limited, and a camera mounted on the rear of the vehicle is close to the trailer and therefore is unable to detect large yaw angles of the trailer relative to the towing vehicle. Indeed, when the yaw angle becomes significant, the trailer exits the field of view of the camera, and the yaw angle cannot be detected.

Therefore, a requirement exists for a method for precisely determining a yaw angle of a longitudinal axis of a trailer relative to a longitudinal axis of a towing vehicle over a wide range of values of the yaw angle.

SUMMARY OF THE INVENTION

To this end, a method is disclosed for determining a yaw angle of a longitudinal axis of a trailer relative to a longitudinal axis of a towing vehicle to which the trailer is hitched at a hitching point, the method comprising:

acquiring, by means of a camera mounted on a lateral side of the towing vehicle and oriented toward the trailer, an image of at least one lateral portion of the trailer;

determining a reference on the image that is visible on the trailer;

determining a visible length on the image between the reference and a vertical edge of the image oriented toward the towing vehicle;

determining the yaw angle at least based on a horizontal field of view of the camera, a width of a matrix of pixels of the camera along a horizontal axis of the camera, coordinates of the hitching point, the visible length, and dimensions of at least one portion of the trailer.

The method allows the yaw angle of the longitudinal axis of a trailer relative to the longitudinal axis of a towing vehicle to be precisely determined over a wide range of values of the yaw angle.

The method is innovative in that it uses a camera mounted on the lateral side of the vehicle. Thus, the reference will always be in the field of view of the camera and will always be visible to the camera, irrespective of the value of the yaw angle.

Furthermore, the method is innovative in determining the yaw angle as a function of the horizontal field of view of the camera, the width of the matrix of pixels, the coordinates of the hitching point, the visible length, and the dimensions of at least one portion of the trailer.

In one embodiment, determining the yaw angle comprises:

determining an observation angle $\beta_{norm}$ between the longitudinal axis of the towing vehicle and a straight line connecting the camera to the reference of the trailer, at least based on said visible length, the horizontal field of view of the camera, and the width of the matrix of pixels of the camera along the horizontal axis of the camera;

determining coordinates of the reference of the trailer by means of an intersection between:

said straight line represented by a straight line equation defined as:

$$y = c * x + d$$

where x and y form point coordinates in a coordinate system comprising the reference, c is a gradient and d is an ordinate value;

a circle centered on the hitching point and having a radius equal to a distance between the hitching point and the reference, wherein the circle is defined as:

$$(x - a)^2 + (y - b)^2 = r^2$$

where a and b are coordinates of the hitching point, and r is the radius of the circle;

determining the yaw angle at least based on said coordinates of the reference of the trailer and on coordinates of the hitching point.

In one embodiment, the coordinate system is centered on the camera and the straight line equation is defined as:

$$y = \tan(\beta_{norm}) * x$$

In one embodiment, the radius of the circle is defined as:

$$r = \sqrt{(T_L)^2 + \left(\frac{T_l}{2}\right)^2}$$

where $T_L$ is a distance along the longitudinal axis of the trailer between the hitching point and the reference, and $T_l$ is a width of the trailer.

3      4

In one embodiment, the observation angle is defined as:

$$\beta_{norm} = \frac{R_x * hFOV}{w} - C_{camera}$$

where $R_x$ is the visible length, hFOV is the horizontal field of view of the camera, w is the width of the matrix of pixels of the camera along the horizontal axis of the camera, and $C_{camera}$ is a normalization angle that takes into account an orientation of the camera relative to the towing vehicle.

In one embodiment, the normalization angle $C_{camera}$ is defined as:

$$C_{camera} = \frac{hFOV}{2} - C_{yaw}$$

where $C_{yaw}$ is a mounting parameter of the camera described as the angle between an optical axis of the camera and a longitudinal axis of the towing vehicle.

In one embodiment, determining the yaw angle comprises:

determining a first auxiliary angle defined as:

$$\Phi = \arctan\frac{OR_y}{OR_x}$$

where $OR_y$ is a distance between the reference of the trailer and the hitching point along a horizontal axis perpendicular to the longitudinal axis of the towing vehicle, and $OR_x$ is a distance between the reference and the hitching point along the longitudinal axis of the towing vehicle, determining a second auxiliary angle defined as:

$$\theta = \arctan\frac{T_l}{2T_L}$$

where $T_L$ is a distance along the longitudinal axis of the trailer between the hitching point and the reference, and $T_l$ is a width of the trailer.

determining the yaw angle defined as:

$$\alpha = \Phi - \theta$$

In one embodiment, the reference comprises at least one portion of a rear vertical edge of the trailer.

In one embodiment, the width of the matrix of pixels and the visible length are determined as a number of pixels on the matrix of the camera.

Another aspect of the present invention relates to a computer program product comprising instructions which, when these instructions are executed by a processor, cause the processor to implement the operations of the method described above.

Another aspect of the invention relates to a system for determining a yaw angle of a longitudinal axis of a trailer relative to a longitudinal axis of a towing vehicle to which the trailer is hitched at a hitching point, the determining system comprising:

a camera adapted to be mounted on a lateral side of the towing vehicle in such a way that it is oriented toward the trailer, and to acquire an image of at least one lateral portion of the trailer; and a computer configured to implement the method described above.

In one embodiment, the towing vehicle comprises at least one rear-view mirror, wherein said at least one camera is configured to be mounted on the at least one rear-view mirror.

In one embodiment, said at least one camera is configured to have a digital rear-view mirror function.

In one embodiment, the determining system comprises two cameras mounted on opposite lateral sides of the towing vehicle, with each of the cameras being configured to acquire an image of at least one lateral portion of the trailer; and wherein the computer is configured to implement the method described above for each of the cameras.

BRIEF DESCRIPTION OF THE DRAWINGS

Further features, details and advantages will become apparent upon reading the following detailed description, and with reference to the appended drawings, in which:

FIG. 5 is a schematic representation of a computer configured to implement the determining method of FIG. 2.

DETAILED DESCRIPTION OF EXEMPLARY EMBODIMENTS

The aim of an aspect of the present invention is a method and a system for determining a yaw angle of a longitudinal axis of a trailer relative to a longitudinal axis of a towing vehicle to which the trailer is hitched.

Figures 1, 2:
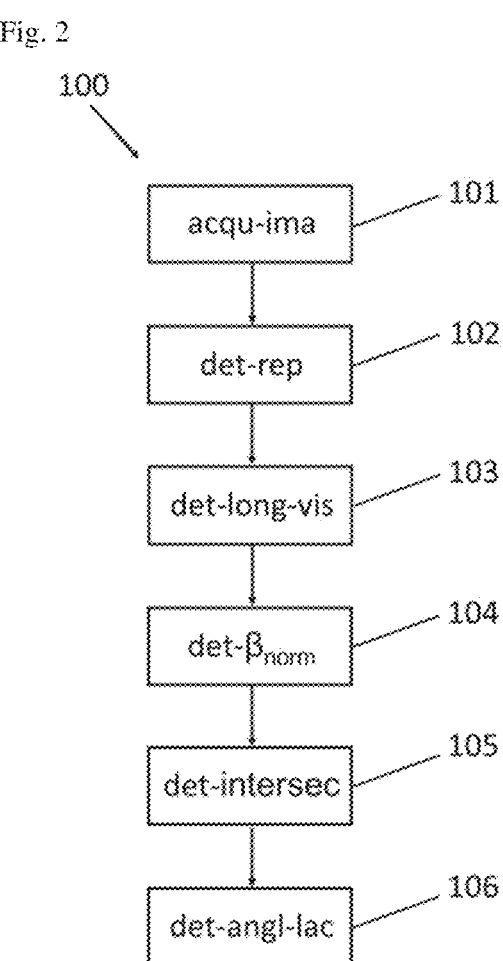
FIG. 1 is a schematic representation of a top view of a system for determining a yaw angle of a longitudinal axis of a trailer relative to a longitudinal axis of a towing vehicle to which the trailer is hitched.
FIG. 2 shows the flow chart of a method for determining a yaw angle of a longitudinal axis of a trailer relative to a longitudinal axis of a towing vehicle to which the trailer is hitched.

FIG. 1 shows such a determining system S that comprises a towing vehicle V and a trailer T hitched to the towing vehicle V at a hitching point O such as a trailer hitch.

The relative orientation of the trailer T relative to the towing vehicle V can be characterized by the yaw angle $\alpha$ that is defined as the angle between the longitudinal axis $L_T$ of the trailer T and the longitudinal axis $L_V$ of the towing vehicle V in the horizontal plane.

The towing vehicle V, which can be, for example, in the form of a car or a lorry, comprises an external rear-view mirror M on each lateral side of the towing vehicle V, allowing a driver of the towing vehicle V to observe a portion of the environment behind them. Notably, the rear-view mirrors M allow a portion of the trailer T to be observed and in particular the orientation of the trailer T relative to the towing vehicle V.

The rear-view mirrors M are installed in the vicinity of the front part of the driver and passenger doors of the vehicle V.

Each rear-view mirror M can be in the form of a camera C or in the form of a mirror on which a camera C is mounted.

Figure 3:
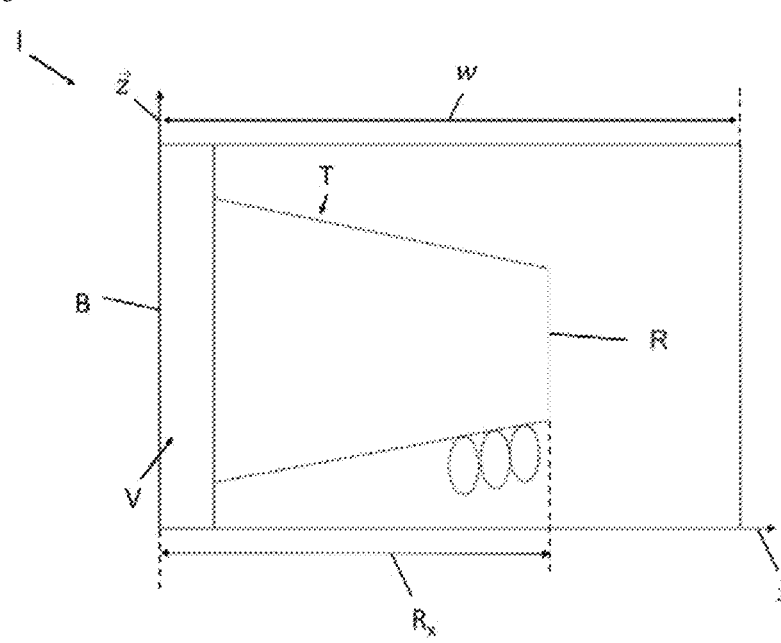
FIG. 3 is a schematic representation of an image of a trailer taken by a camera of the determining system of FIG. 1, with the camera being mounted on the left-hand side of the towing vehicle.

Each camera C is oriented toward the trailer T and is adapted to acquire an image I or a series of images I of at least one lateral portion of the trailer T A schematic representation of such an image I is shown in FIG. 3.

Each camera C comprises a matrix of pixels, which is typically rectangular and comprises a horizontal axis $\vec{x}$ and a vertical axis $\vec{z}$. Consequently, the image I taken by the camera is also rectangular and is defined by the same axes, i.e., the horizontal axis $\vec{x}$ and the vertical axis $\vec{z}$.

In the example shown in FIG. 3, a portion of the towing vehicle V is visible on the image I. However, when determining the yaw angle the towing vehicle V does not need to be visible on the image I.

The trailer T comprises a reference R on each lateral side, with each of the references R being visible to the respective camera C on the same lateral side of the trailer T For example, the reference R can be a rear vertical edge of the trailer T. The respective reference R can be identified on the image I taken by one of the cameras C and used in determining the yaw angle α.

The determining system S further comprises a computer P that is described in further detail with reference to FIG. 5. The computer P is configured to implement a method 100 for determining the yaw angle α, the flowchart of which method is shown in FIG. 2.

For the sake of simplicity and in order to best illustrate the method 100 described hereafter, a single camera C and a single reference R on the same side of the trailer T are considered.

When the method 100 is implemented, the camera C acquires 101 an image I of at least one portion of the trailer T, as shown in FIG. 2.

The reference R is detected 102 on the image I. Next, the distance, also called visible length $R_x$, between the reference R and the vertical edge B closest to the towing vehicle V is determined 103 on the image I.

The visible length $R_x$ can be determined along the horizontal axis $\vec{x}$ in terms of the number of pixels on which the trailer T and the towing vehicle V are visible.

Figure 4:
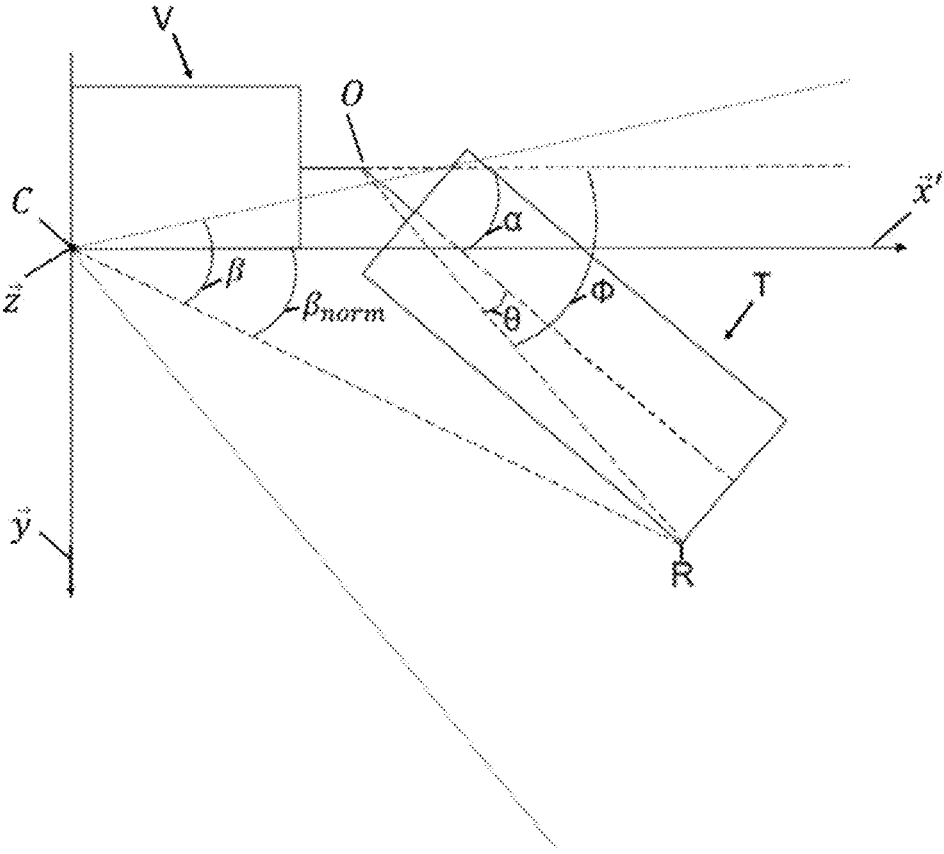
FIG. 4 is a further schematic representation of a top view of the determining system of FIG. 1.

The angles and distances determined and used in the remainder of method 100 are best understood with reference to FIG. 4, which shows a schematic representation of the determining system S.

The coordinates of the various points determined and/or used in the method 100 all relate to a coordinate system centered on the camera C. In this coordinate system, a first axis $\vec{x}'$ is oriented along the longitudinal axis $L_v$ of the towing vehicle V, and a second axis $\vec{y}$ is oriented along the width of the towing vehicle V, i.e., in the horizontal plane and perpendicular to the first axis $\vec{x}'$.

The vertical axis $\vec{z}$ is defined relative to the first and second axes $\vec{x}'$ and $\vec{y}$ so as to form an orthogonal reference.

Next, an observation angle $\beta_{norm}$, defined as the angle between a straight line connecting the camera C to the reference R and the longitudinal axis $L_v$ of the towing vehicle V, is determined 104:

$$\beta_{norm} = \beta - C_{camera}$$

In this case, β is the auxiliary observation angle defined as the angle between the straight line connecting the camera C to the reference R and a straight line defining the horizontal field of view of the camera C on the side of the towing vehicle V. The horizontal field of view is the horizontal portion of the solid angle through which the camera C is sensitive to its environment. The horizontal field of view can be defined by two straight lines that respectively delimit zones that are visible to the camera C from zones that are not visible to the camera C.

$C_{camera}$ is a normalization angle that takes into account the orientation of the camera C relative to the towing vehicle V.

The auxiliary observation angle β is defined as:

$$\beta = \frac{R_x * hFOV}{w}$$

where w is the width of the image I along the horizontal axis $\vec{x}$ of the image I, and hFOV is the horizontal field of view of the camera C. The width w of the matrix of pixels and the horizontal field of view hFOV are known parameters of the camera C.

The normalization angle $C_{camera}$ is defined as:

$$C_{camera} = \frac{hFOV}{2} - C_{yaw}$$

where $C_{yaw}$ is a mounting parameter (not shown in the figures) of the camera C described as the angle between the optical axis of the camera C and the longitudinal axis $L_V$ of the towing vehicle V. The angle $C_{yaw}$ depends on the orientation of the camera C relative to the towing vehicle V and can be determined for a given orientation of the camera C.

The straight line equation of the straight line that includes the camera C and the reference R is defined as:

$$y = c * x + d$$

c is a gradient and d is an ordinate value. c in this case is equal to $\tan(\beta_{norm})$. It should be noted that, when the yaw angle α changes, all the possible positions of the reference R will lie on a circle centered on the hitching point O and having the distance between the hitching point O and the reference R as the radius.

The equation describing the circle is:

$$(x - a)^2 + (y - b)^2 = r^2$$

where a and b are coordinates of the hitching point O. These coordinates a, b in the coordinate system centered on the camera C are known or can be determined.

The coordinates of the reference R can be determined 105 by determining the intersection of said circle $((x-a)^2 + (y-b)^2 = r^2)$ with said straight line $(y=\tan(\beta_{norm})*x)$. The coordinate y in the equation of the circle is replaced by the equation of the straight line to this end:

$$(x - a)^2 + (y - b)^2 = r^2$$

$$x^2 - 2ax + a^2 + y^2 - 2by + b^2 - r^2 = 0$$

$$x^2 - 2ax + a^2 + (\tan(\beta_{norm}) * x)^2 - 2b\tan(\beta_{norm}) * x) + b^2 - r^2 = 0 \quad 5$$

$$\left(1 + \tan^2(\beta_{norm})\right)x^2 - (2a + 2b\tan(\beta_{norm})x) + \left(a^2 + b^2 - r^2\right) = 0$$

$$A_2 x^2 + A_1 x + A_0$$

where $A_2 = 1 + \tan^2(\beta_{norm})$, $A_1 = -(2a + 2b\tan\beta_{norm})$, $A_0 = a^2 + b^2 - r^2$ 10

A second-order equation is obtained with the coefficients $A_2$, $A_1$, $A_0$.

$A_0$ is a function of the radius r of the circle, which can be determined as a function of the dimensions of the trailer T: 15

$$r = OR = \sqrt{(T_L)^2 + \left(\frac{T_l}{2}\right)^2}$$

$T_L$ is the distance along the longitudinal axis $L_T$ of the trailer T between the hitching point O and the reference R, and $T_l$ is the width of the trailer T. In the case whereby the reference R is the rear vertical edge of the trailer T, $T_L$ 25 corresponds to the length of the trailer T, i.e., $T_L$ is the distance along the longitudinal axis $L_T$ of the trailer T between the hitching point O and the reference R. The distance $T_L$ and the width $T_l$ are known parameters of the trailer T. 30

There are two solutions for x that correspond to the two intersections between the circle and the straight line:

$$x_{1/2} = \frac{-A_1 \pm \sqrt{\Delta}}{2 * A_2}$$ 35 where $\Delta = (A_1)^2 - 4 * A_2 * A_0$.

One of the two solutions corresponds to the coordinate $x_R$ 40 of the reference R. The other solution can be dismissed. The corresponding coordinate $y_R$ of the reference R can be obtained by introducing the coordinate $x_R$ into the straight line equation:

$$y_R = \tan(\beta_{norm}) * x_R$$ 45

In order to determine the yaw angle $\alpha$, a first auxiliary angle $\Phi$ and a second auxiliary angle $\theta$ are determined.

The first auxiliary angle $\Phi$ refers to the angle between the longitudinal axis $L_v$ of the towing vehicle V and the straight 50 line connecting the hitching point O and the reference R, and is defined as:

$$\Phi = \arctan\frac{OR_y}{OR_x} = \arctan\frac{y_R - b}{x_R - a}$$ 55

The second auxiliary angle $\theta$ refers to the angle between the longitudinal axis $L_T$ of the trailer T and the straight line connecting the hitching point O to the reference R, and is 60 defined as:

$$\theta = \arctan\frac{T_l}{2T_L}$$ 65

Thus, the yaw angle $\alpha$ can be determined 106:

$$\alpha = \Phi - \theta$$

In order to be able to detect the yaw angle $\alpha$ on both sides of the towing vehicle V, a camera C on each lateral side of the towing vehicle V can be used. Thus, a reference R on the trailer T will always be visible to one of the two cameras C.

The method 100 can be implemented repeatedly in order to repeatedly provide updated values of the yaw angle $\alpha$.

Figure 5:
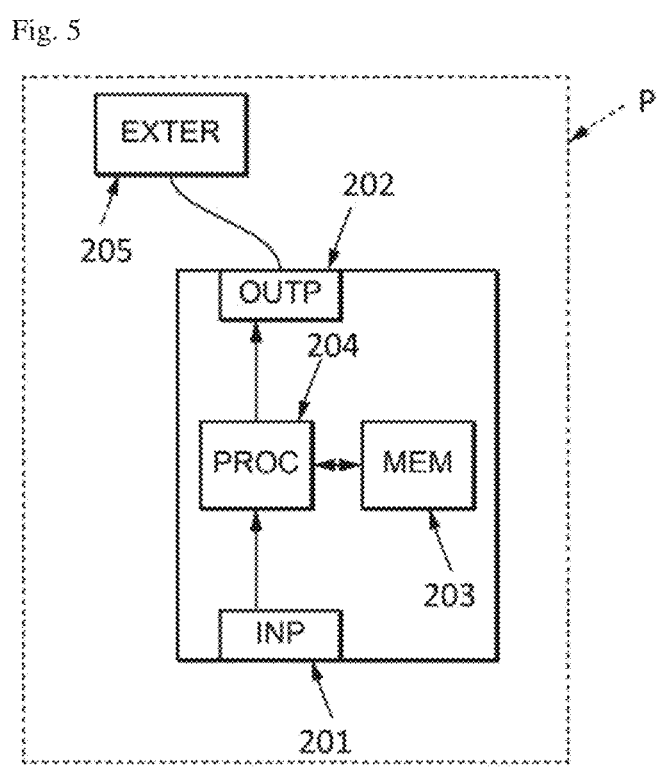

FIG. 5 shows an embodiment of the computer P configured to implement at least some of the method 100.

The computer P comprises at least one input interface 201 for receiving messages or instructions, and at least one output interface 202 for communicating with external devices 205.

The computer P further comprises a memory 203 for storing instructions for implementing at least some of the method 100, the received data, and temporary data for carrying out the various operations 101, 102, 103, 104, 105, 106 of the method 100 as described above.

The computer P further comprises a processing circuit 204. This circuit can be, for example:

- a processor capable of interpreting instructions in the form of a computer program; or
- an electronic board, on which the operations of the method 100 of the disclosure can be described in the silicon; or even
- a programmable electronic chip such as a Field-Programmable Gate Array (FPGA) chip, a System-On-A-Chip (SOC) chip or an Application Specific Integrated Circuit (ASIC) chip.

Depending on the embodiment, the computer P can be a computer, a network of computers, an electronic component, or another appliance comprising a processor operationally connected to a memory, as well as, depending on the selected embodiment, a data storage unit, and other associated hardware elements, such as a network interface and a media reader for reading a detachable storage medium and writing to such a medium, not shown in FIG. 5. The detachable storage medium can be, for example, a compact disc (CD), a digital versatile disc (DVD), a flash drive, a USB key, etc.

Depending on the embodiment, the memory 203, the data storage unit or the detachable storage medium contain instructions which, when executed by the processing circuit 204, cause this circuit to control the at least one input interface 201, the at least one output interface 202, or to store data in the memory 203 and/or to process data and/or to implement at least some of the method 100 according to FIG. 2.

The processing circuit 204 can be a component for controlling the computer P.

Furthermore, the computer P can be implemented in software form, in which case it is in the form of a program that can be executed by a processor, or in hardware form, such as an application-specific integrated circuit (ASIC), a system-on-a-chip (SOC), or in the form of a combination of hardware and software elements, for example, a software program intended to be loaded and executed on an electronic component described above, such as an FPGA.

The computer P can also use hybrid architectures, for example, architectures based on a CPU+FPGA, a GPU (Graphics Processing Unit) or an MPPA (Multi-Purpose Processor Array).

The present disclosure is not limited to the examples of devices, systems, methods, uses and computer program products that are described above solely by way of an example, but it encompasses all the variants that a person skilled in the art could contemplate within the desired scope of protection.

The invention claimed is:

1. A method for determining a yaw angle of a longitudinal axis of a trailer relative to a longitudinal axis of a towing vehicle to which the trailer is hitched at a hitching point, the method comprising:

acquiring, by means of a camera mounted on a lateral side of the towing vehicle and oriented toward the trailer, an image of at least one lateral portion of the trailer;

determining a reference on the image that is visible on the trailer;

determining a visible length on the image between the reference and a vertical edge of the image oriented toward the towing vehicle;

determining the yaw angle at least based on a horizontal field of view of the camera, a width of a matrix of pixels of the camera along a horizontal axis of the camera, coordinates of the hitching point, the visible length, and dimensions of at least one portion of the trailer;

and wherein determining the yaw angle comprises:

determining an observation angle between the longitudinal axis of the towing vehicle and a straight line connecting the camera to the reference of the trailer, at least based on said visible length, the horizontal field of view of the camera, and the width of the matrix of pixels of the camera along the horizontal axis of the camera;

determining coordinates of the reference of the trailer by means of an intersection between:

said straight line represented by a straight line equation defined as:

$$y = c*x + d$$

where x and y form point coordinates in a coordinate system comprising the reference (R), c is a gradient and d is an ordinate value;

a circle centered on the hitching point and having a radius equal to a distance between the hitching point and the reference, wherein the circle is defined as:

$$(x-a)^2 + (y-b)^2 = r^2$$

where a and b are coordinates of the hitching point, and r is the radius of the circle;

determining the yaw angle at least based on said coordinates $(x_R, y_R)$ of the reference of the trailer and on coordinates of the hitching point.

2. The method according to claim 1, wherein the coordinate system is centered on the camera and the straight line equation is defined as:

$$y = \tan(\beta_{norm})*x.$$

3. The method according to claim 1, wherein the radius of the circle is defined as:

$$r = \sqrt{(T_L)^2 + \left(\frac{T_l}{2}\right)^2}$$

where $T_L$ is a distance along the longitudinal axis of the trailer between the hitching point and the reference, and $T_l$ is a width of the trailer.

4. The method according to claim 1, wherein the observation angle is defined as:

$$\beta_{norm} = \frac{R_x * hFOV}{w} - C_{camera}$$

where $R_x$ is the visible length, hFOV is the horizontal field of view of the camera, w is the width of the matrix of pixels of the camera along the horizontal axis of the camera, and $C_{camera}$ is a normalization angle that takes into account an orientation of the camera relative to the towing vehicle.

5. The method according to claim 4, wherein the normalization angle is defined as:

$$C_{camera} = \frac{hFOV}{2} - C_{yaw}$$

where $C_{yaw}$ is a mounting parameter of the camera described as an angle between an optical axis of the camera and the longitudinal axis of the towing vehicle.

6. The method according to claim 1, wherein determining the yaw angle comprises:

determining a first auxiliary angle defined as:

$$\Phi = \arctan\frac{OR_y}{OR_x}$$

where $OR_y$ is a distance between the reference of the trailer and the hitching point along a horizontal axis perpendicular to the longitudinal axis of the towing vehicle, and $OR_x$ is a distance between the reference and the hitching point along the longitudinal axis of the towing vehicle;

determining a second auxiliary angle defined as:

$$\theta = \arctan\frac{T_l}{2T_L}$$

where $T_L$ is a distance along the longitudinal axis of the trailer between the hitching point and the reference, and $T_l$ is a width of the trailer;

determining the yaw angle defined as:

$$\alpha = \Phi - \theta.$$

7. A non-transitory computer program product comprising instructions which, when these instructions are executed by a processor, cause the processor to implement operations of a method according to claim 1.

8. A system for determining a yaw angle of a longitudinal axis of a trailer relative to a longitudinal axis of a towing vehicle to which the trailer is hitched at a hitching point, the determining system comprising:

a camera adapted to be mounted on a lateral side of the towing vehicle in such a way that it is oriented toward the trailer, and to acquire an image of at least one lateral portion of the trailer; and a computer configured to implement a method according to claim 1.

9. The system according to claim 8, wherein said at least one camera is configured to have a digital rear-view mirror function.

10. The method according to claim 2, wherein the radius of the circle is defined as:

$$r = \sqrt{(T_L)^2 + \left(\frac{T_l}{2}\right)^2}$$

where $T_L$ is a distance along the longitudinal axis of the trailer between the hitching point and the reference, and $T_l$ is a width of the trailer.

* * * * *